April 26, 1960 P. FAIBUSCH 2,934,294
AIRPLANE SAFETY DEVICE EMBODYING PARACHUTE AND HELICOPTER
Filed April 1, 1957 5 Sheets-Sheet 1

INVENTOR.
PINKUS FAIBUSCH
BY Carl Miller
ATTORNEY

April 26, 1960 P. FAIBUSCH 2,934,294
AIRPLANE SAFETY DEVICE EMBODYING PARACHUTE AND HELICOPTER
Filed April 1, 1957 5 Sheets-Sheet 2
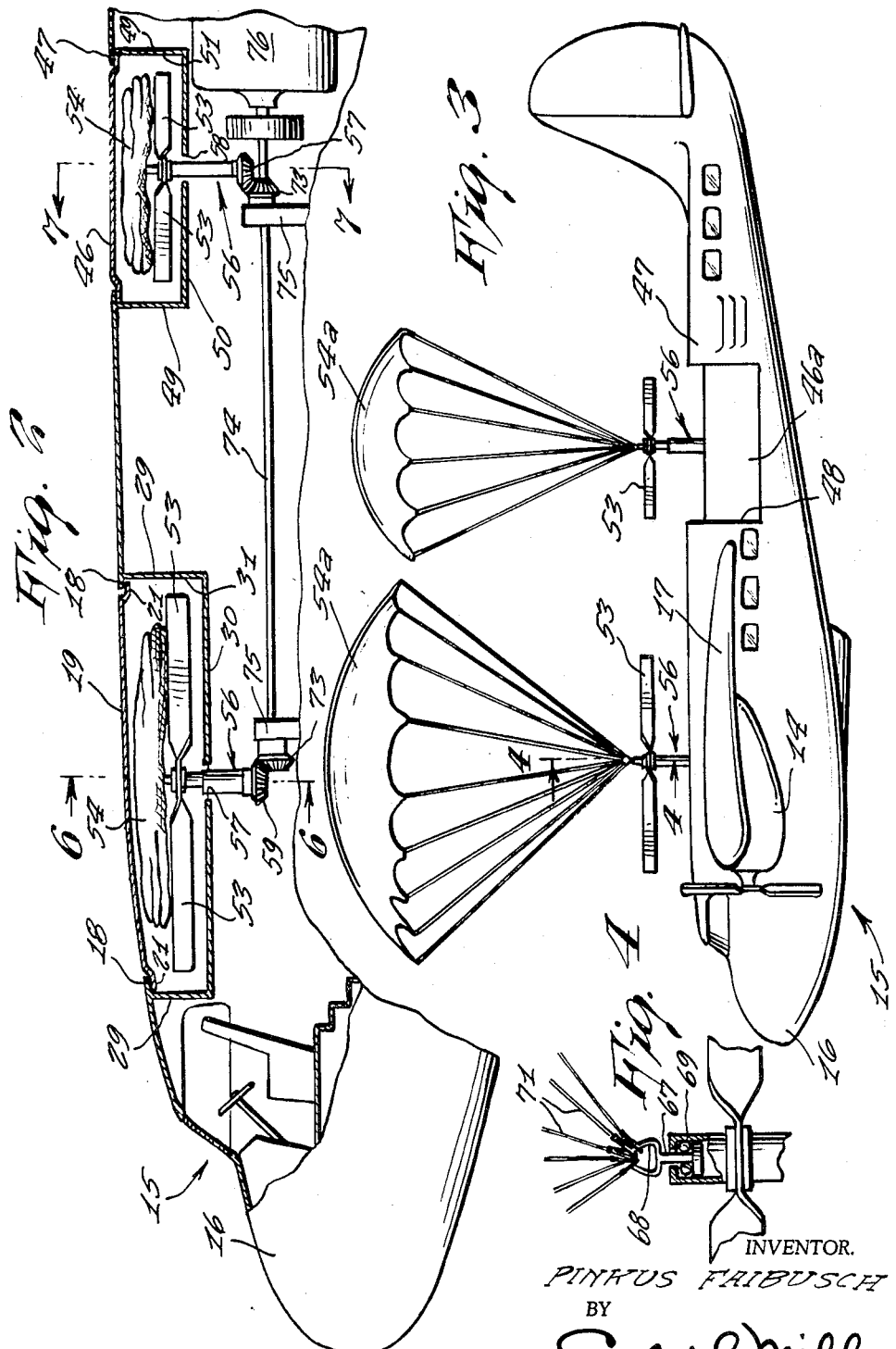
INVENTOR.
PINKUS FAIBUSCH
BY
Carl Miller
ATTORNEY

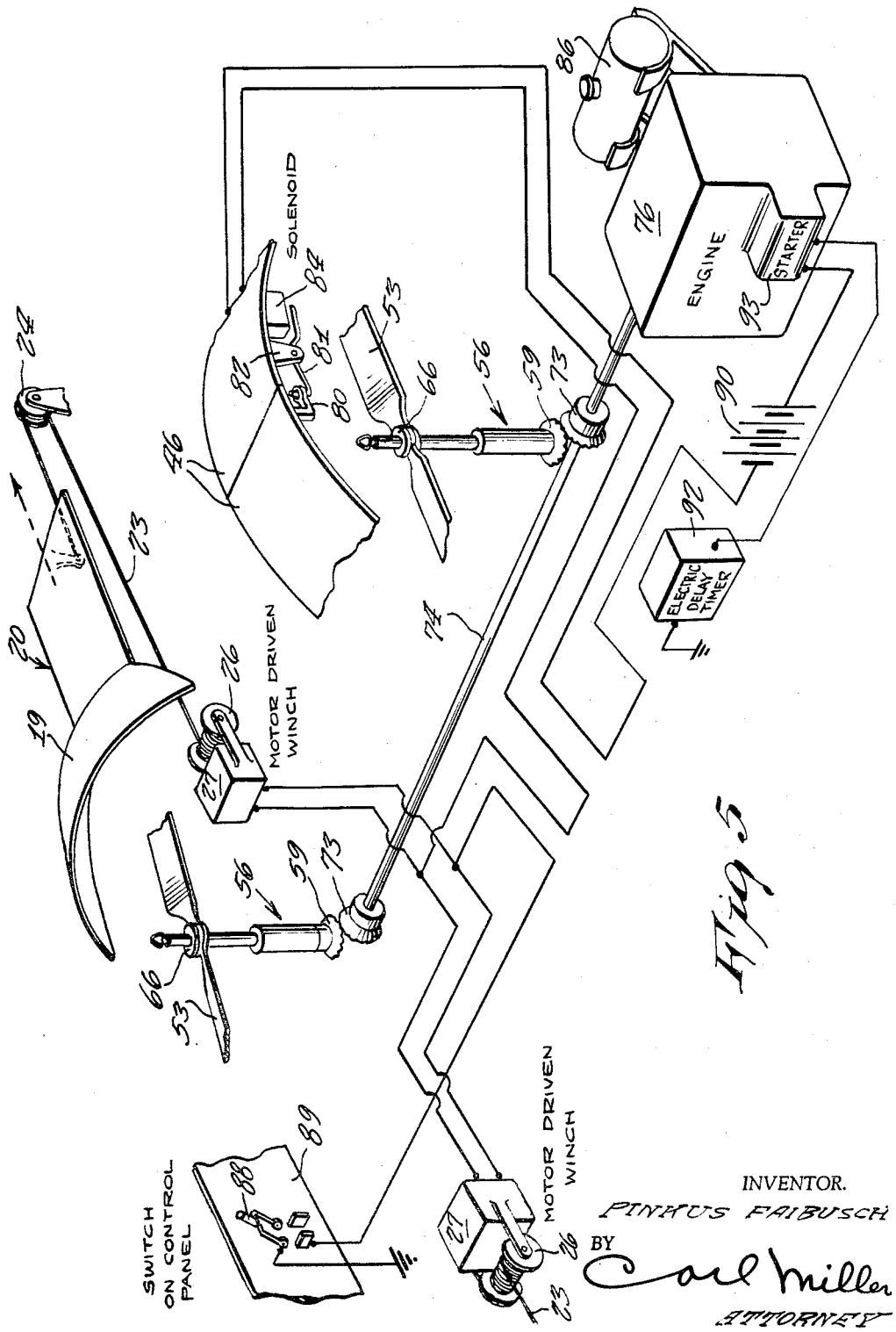

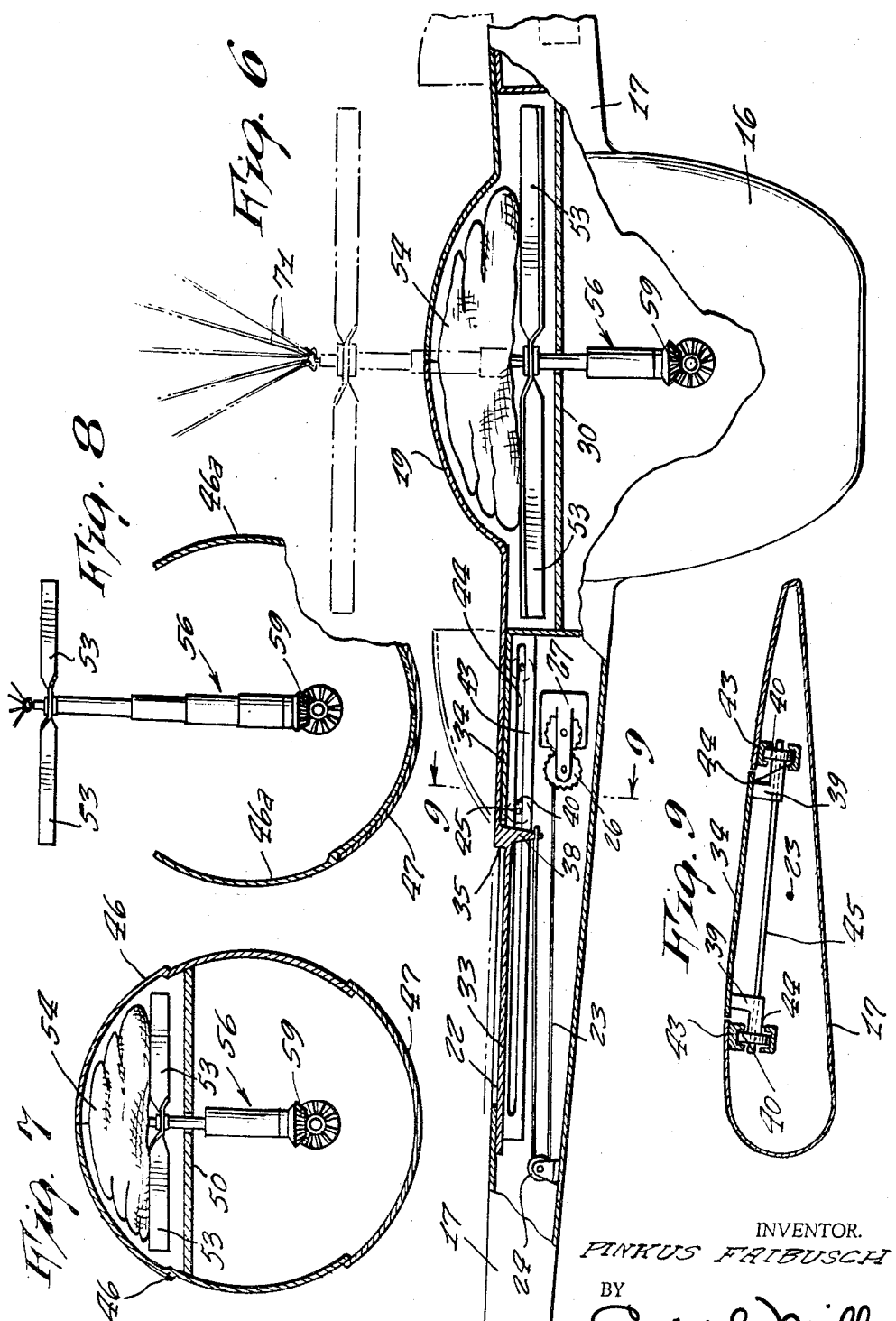

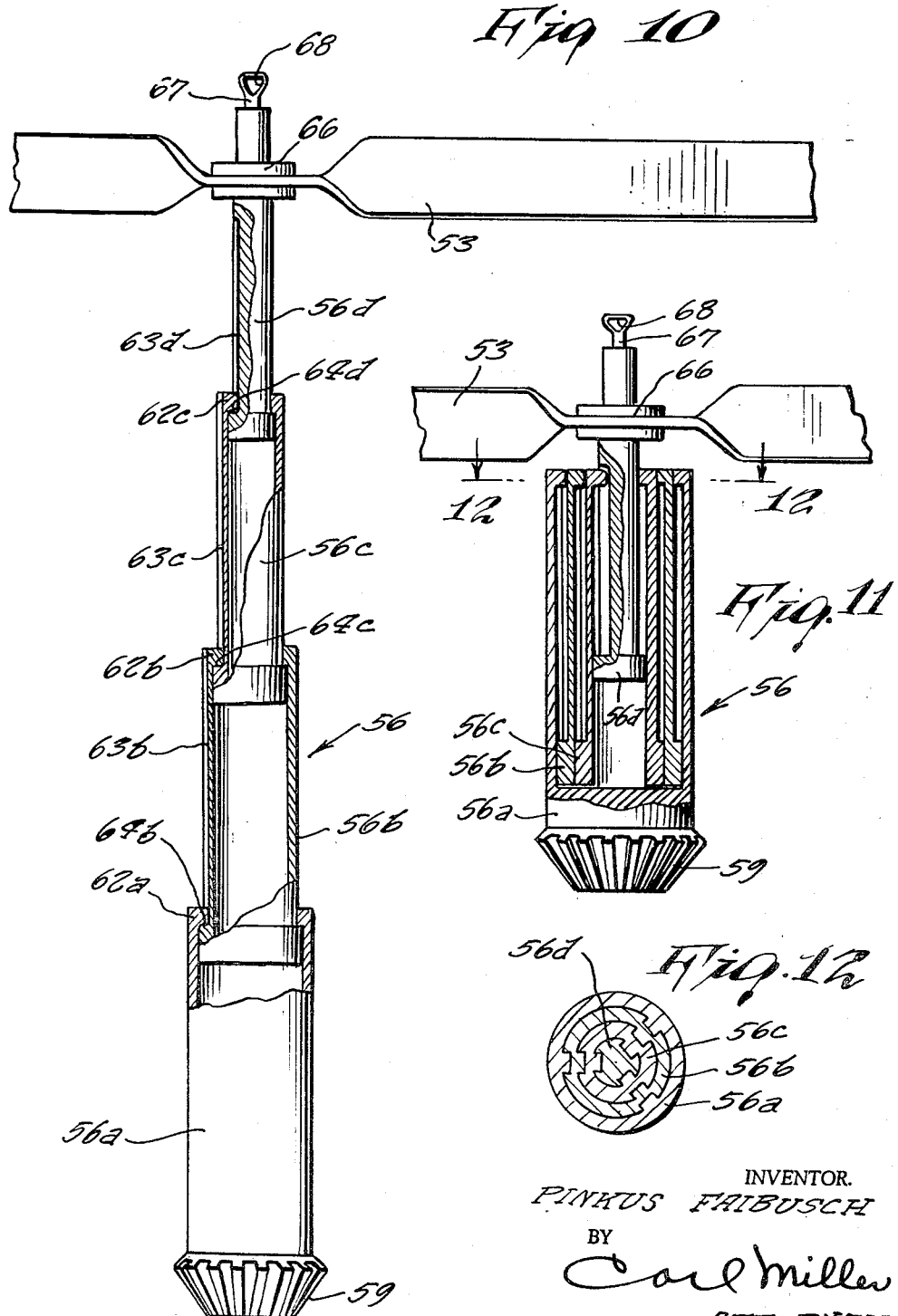

United States Patent Office 2,934,294
Patented Apr. 26, 1960

2,934,294

AIRPLANE SAFETY DEVICE EMBODYING PARACHUTE AND HELICOPTER

Pinkus Faibusch, New York, N.Y.

Application April 1, 1957, Serial No. 649,685

2 Claims. (Cl. 244—139)

This invention relates to aircraft and, more particularly, to suspension means for automatically controlling the descent of aircraft in the absence of the main propelling engines thereof.

There are various causes of engine failure which result in the disastrous loss of lives and property. In many instances, it would be possible to prevent this loss if standby equipment was available for controlling the rate of descent of the aircraft as it approached the ground in the absence of propelling power. It is an object of the present invention therefore to provide efficient suspension means that is adapted to be carried within the fuselage of the aircraft, whereby necessary control of the descent of the aircraft may be obtained in a simple and efficient manner, independently of the main propelling engines of the aircraft.

Another object of the present invention is to provide a drive system for auxiliary suspension apparatus for aircraft that is simple in construction, efficient in operation, and which is operative to cushion the fall of a disabled aircraft.

A still further object of the present invention is to provide a descent control device for aircraft in which a fuselage is provided with a forward and rear hatch, each of which contains a set or rotor blades and a parachute that may be extended into an operative position in response to the failure of the main propelling engines of the aircraft.

All of the foregoing and still further objects and advantages of this invention will become apparent from a study of the following specification, taken in connection with the accompanying drawing, wherein:

Figure 2 is a side elevational view, with parts broken away, showing another portion of the aircraft shown in Figure 1;

Figure 3 is a side elevational view of an aircraft made in accordance with the present invention, with the descent control apparatus in operative use;

Figure 4 is an enlarged cross sectional view taken along line 4—4 of Figure 3;

Figure 5 is an electro-mechanical diagram of the major components of the present invention;

Figure 6 is an enlarged cross sectional view taken along line 6—6 of Figure 2;

Figure 7 is an enlarged cross sectional view taken along line 7—7 of Figure 2;

Figure 8 is a view similar to Figure 7, showing the parts in an extended position;

Figure 9 is a cross sectional view taken along line 9—9 of Figure 6;

Figure 10 is an enlarged side elevational view of a rotor shaft forming a part of the present invention;

Figure 11 is a view similar to Figure 10, showing the parts in a collapsed position; and Figure 12 is a cross sectional view taken along line 12—12 of Figure 11.

Figure 1:
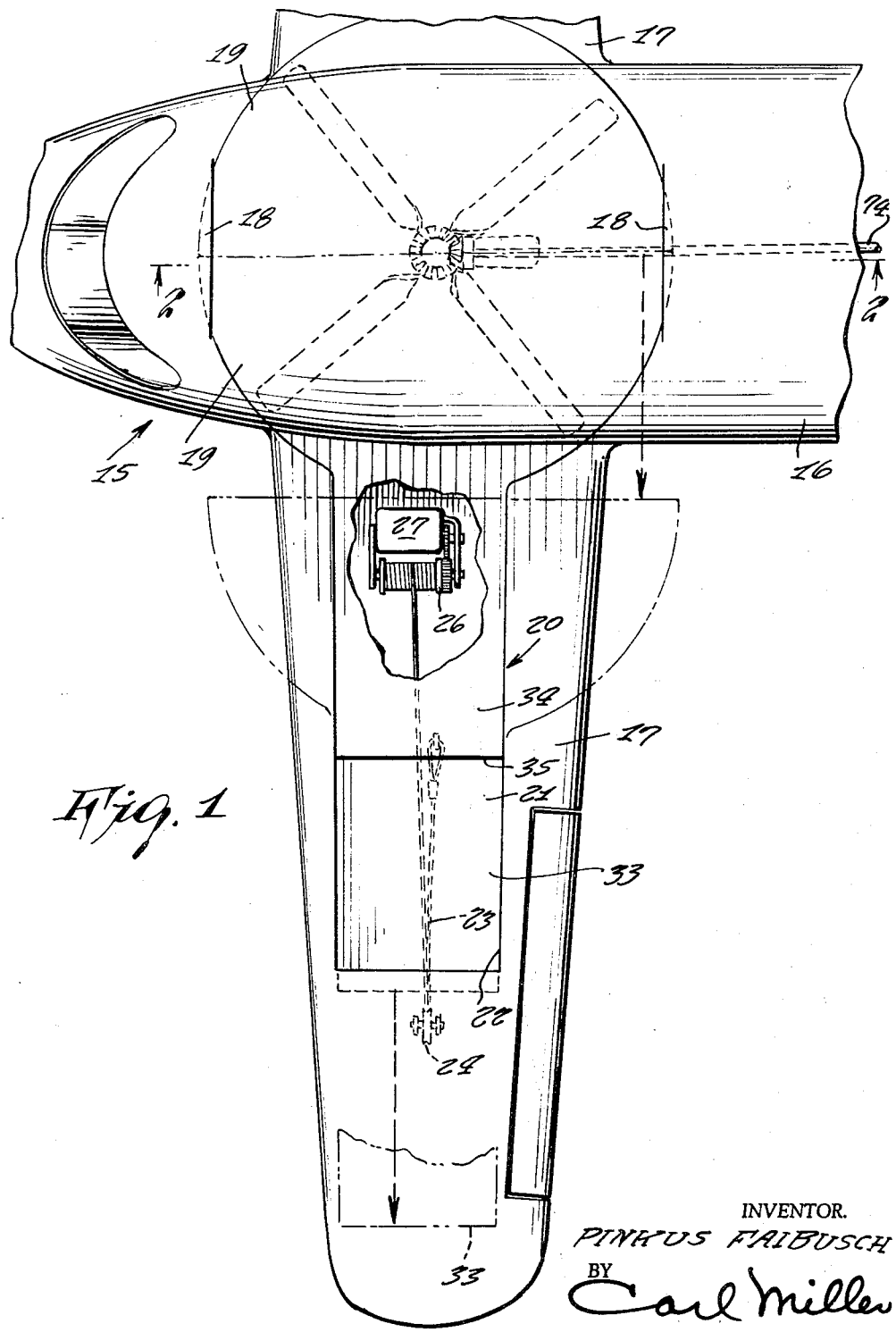
Figure 1 is a fragmentary top elevational view, with parts broken away, of a portion of an aircraft embodying the present invention.

Referring now to the drawing, a device made in accordance with the present invention is shown in operative association with an airplane 15 having a fuselage 16, a pair of wings 17, and propelling engines 14. As is more clearly shown in Figures 1, 5 and 6, the forward top part of the fuselage is provided with a pair of retractable canopies 19 that are slidably supported upon the wings 17. Each canopy includes a portion that forms a part of the fuselage structure and a plate 20 that is slidably received within a slot 22 in the wing. As is more clearly shown in Figure 2, each canopy portion is provided with a pair of offset flanges 21 that underlie straight parts of the opening defining portions 18 in the top of the fuselage so as to guide the canopy from a closed toward an open position. A pulley 24 secured to the inside of the wing guides a flexible cable 23 from the outermost end of the wing plate 20 toward the drum 26 of a winch that is driven by an electric motor 27. The canopies 19 form a retractable top wall for a compartment 31 formed within a fuselage by spaced side walls 29 and a bottom wall 30.

Each wing plate 20 includes an outer portion 33 that is disposed beneath the inside surface of the upper wing defining portions and an outwardly offset inner portion 34 that overlies the adjacent portions of the wing. A shoulder 35 is defined between the outer and inner portions of the plate, which shoulder limits the outward movement of the canopy parts. A downwardly extending lug 35 is secured adjacent to the shoulder 35 and receives the free end of the flexible cable 23. As is more clearly shown in Figure 9, the wing plate 20 also includes a pair of outwardly extending side arms 39 each of which supports a roller 40 upon a transversely extending shaft 45. These rollers are slidably received within the oppositely facing webs of a longitudinally extending channel 43, a longiutdinal slot 44 being provided in the main web thereof to accommodate the shaft 45 that extends therethrough. Thus, upon energization of the electric motor 27, the cable 23 is operative to pull the wing plate 20 and associated canopy 19 outwardly upon the guide rollers 40, whereby the compartment 31 is exposed.

Another similar compartment 51 is formed in the rear portion of the fuselage, as shown in Figure 2. This compartment 51 includes spaced side walls 49 and a bottom wall 50 that are similar to the corresponding walls of the forward hatch. The top of the compartment 51 is closed by a pair of arcuate panels 46 that are rotatably and slidably upon the portions 47 that define the opening 48 in the fuselage. As is more clearly shown in Figures 7 and 8, rotation of the panels 46 toward an open position 46a, exposes the compartment 51 to the exterior of the aircraft.

Descent control apparatus is disposed within each of the forward and rear hatches, each being substantially identical to the other. As shown in Figure 2, each set of apparatus includes a set of rotatable helicopter blades 53 and a parachute 54. Both the blades and the parachute are secured to a multi-section telescoping shaft 56, that is selectively movable between a collapsed and an extended position. With reference to Figures 10 to 12, the shaft 56 is shown to include similar sections 56a 56b, 56c, 56d, the lowermost section 56a having a bevel gear 59 secured to the lowermost end. This end of the shaft extends through openings 57, 58, in the bottom walls 30, 51, respectively, of the forward and rear hatches. Each section of the shaft is also provided with an inwardly extending lugs 62a, b, c, each of which is slidably received within similarly shaped grooves 63b, c, d that terminate at their lowermost extremity in stop shoulders 64b, c, d. Thus, the sections are slidably secured together for movement between a collapsed position and an extended position, which movement is limited by the associated lugs and grooves, whereby rotation of the lowermost section 56a is automatically transmitted to the rigidly secured rotor blades 53. The rotor blades 53 include a securement collar 66 through which a projection 67 having an eye 68 extends. This projection 67, as more clearly shown in Figure 4, is rotatably supported upon the upper section of the shaft by means of ball bearings 69 and is adapted to receive the shroud lines 71 of the parachute 54 associated therewith.

With reference to Figures 2 and 5, it will be recognized that longitudinally spaced bevel gears 73 engage the similar bevel gears 59 on each rotor shaft. These bevel gears are secured to a longitudinally extending drive shaft 74 that is supported within the fuselage by spaced bearings 75 and is adapted to be rotated by an internal combustion engine 76 that is completely independent of the main propelling engines of the aircraft. Furthermore, this engine 76 is provided with an independent fuel storage tank 86 so that it is not dependent upon the ordinary fuel supply tanks of the aircraft for its operation.

As is clearly shown in Figure 5 of the drawing, the arcuate panels 46 of the rear hatch are releasably secured together in a closed position by means of an eye lug 80 that releasably receives the latch element 81 that is rotatably supported upon the brackets 82 carried by one of the panels. A solenoid when energized, is adapted to effect the withdrawal of the latch element 81 from the eye lug 80 so that the panels 46 automatically drop by gravity to the open position 46a.

The control system, as shown in Figure 5, includes a manually operable switch 88 that is supported upon the instrument panel 89 of the aircraft. In response to the closing of the switch 88, a storage battery 90 is electrically connected to the electric motors 27 within the wing sections and the solenoid 84, whereupon the canopy sections 19 are automatically retracted by the winding of the flexible cables 23, simultaneously with the movement of the panels 46 by gravity to the open position 46a. A time delay switch 92, of any conventional type, temporarily prevents the energization of the starter 93 for the engine 76, so that the drive shaft 74 is not rotated until after the forward and rear hatches have been opened. As the hatches are opened, the air passing over the fuselage creates a low pressure area within the hatches from which the parachutes 54 are drawn outwardly by the draft and wind created so as to also extend the rotor shaft sections to the extended position, whereupon the parts assume the positions shown in Figure 3. After the predetermined period of time has elapsed, the engine 76 is started by the starter 93 and the drive shaft 74 is effective to rotate the blades 53 on each drive shaft, independently of the stationary position of the opened parachutes 54a. A swivel connection afforded by the bearings 69, permits the rotor blades 53 to be rotated with respect to the parachute and the aircraft. The speed of rotation of the blades can be controlled by any desired control apparatus, so that the aircraft may be provided with a sufficient lifting force as the aircraft approaches the ground, thereby minimizing any damage to property and persons. Of course, it is only intended to use the aforementioned safety apparatus in response to failure of the regular propelling engines. Therefore, all parts are maintained in proper operating conditions so that they are constantly ready in case of emergency.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An aircraft having a fuselage, a set of wings secured to the fuselage for supporting the aircraft in flight, engine drive means carried by said wings for propelling the aircraft in flight, safety apparatus supported within said fuselage controlling the descent of said aircraft upon failure of said drive means comprising, in combination, a forward hatch in the forward upper portion of said fuselage and a rear hatch in the rearward upper portion of said fuselage, suspension means displaceably supported within each said hatch, and releasable closure means enclosing each said hatch, said suspension means including an extendable rotor shaft, a set of rotor blades secured to said shaft, motor power means including an independent internal combustion engine carried within said fuselage, and gear means drivingly connecting said engine to said rotor shaft, each said rotor shaft including a plurality of telescopically engaged sections splined together for reciprocating movement between a collapsed and an extended position, a parachute releasably supported within each of said hatches with said rotor blades, the shroud lines of said parchute being connected to the outer end of said rotor shaft, whereby the opening of said closure means exposes the interior of said hatches to a higher atmospheric pressure for effecting the withdrawal of said parachute and the sections of said rotor shaft, and said closure means for said forward hatch comprising a pair of longitudinally separable members each slidably supported upon one of said wings for movement between a closed position and an open position.

2. An aircraft as set forth in claim 1, wherein said closure means for said rear hatch includes a pair of arcuate panels slidably supported upon said fuselage for limited rotation by gravity about the longitudinal axis of said fuselage.

References Cited in the file of this patent
UNITED STATES PATENTS

| | | |
|---|---|---|
| 1,677,638 | Jost | July 17, 1928 |
| 2,334,028 | Raio | Nov. 9, 1943 |
| 2,352,721 | Krahel | July 4, 1944 |
| 2,497,590 | Drill | Feb. 14, 1950 |
| 2,812,147 | Trabucco | Nov. 5, 1957 |